United States Patent
Zuckerberg et al.

(10) Patent No.: US 10,261,970 B2
(45) Date of Patent: *Apr. 16, 2019

(54) MAPPING RELATIONSHIPS BETWEEN MEMBERS IN A SOCIAL NETWORK

(71) Applicant: Facebook, Inc., Menlo Park, CA (US)

(72) Inventors: Mark E. Zuckerberg, Palo Alto, CA (US); Aaron Sittig, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/877,873

(22) Filed: Oct. 7, 2015

(65) Prior Publication Data

US 2016/0026721 A1    Jan. 28, 2016

Related U.S. Application Data

(63) Continuation of application No. 11/639,655, filed on Dec. 14, 2006, now Pat. No. 9,183,599.
(Continued)

(51) Int. Cl.
```
G06F 7/00        (2006.01)
G06F 16/9535     (2019.01)
G06F 16/2457     (2019.01)
G06Q 10/10       (2012.01)
G06Q 50/00       (2012.01)
```
(Continued)

(52) U.S. Cl.
CPC .... *G06F 16/9535* (2019.01); *G06F 16/24575* (2019.01); *G06F 16/24578* (2019.01); *G06Q 10/10* (2013.01); *G06Q 50/00* (2013.01); *G06Q 50/10* (2013.01); *H04L 63/104* (2013.01); *G06F 16/958* (2019.01); *H04L 67/22* (2013.01); *H04L 67/306* (2013.01)

(58) Field of Classification Search
CPC ..................................................... G06F 16/288
USPC ......................................................... 707/784
See application file for complete search history.

(56) References Cited

U.S. PATENT DOCUMENTS 5,937,413 A    8/1999  Hyun
6,029,141 A    2/2000  del'Etraz et al.
(Continued)

FOREIGN PATENT DOCUMENTS

WO    WO 2007/070676    6/2007

OTHER PUBLICATIONS

Chipin. Chipin: The easy way to collect money [online], Dec. 15, 2006; http://web.archive.org/web/20061215090739/www.chipin.com/overview.
(Continued)

*Primary Examiner* — Eliyah S. Harper
(74) *Attorney, Agent, or Firm* — Fenwick & West LLP

(57) ABSTRACT

A system, method, and computer program for social mapping is provided. Data about a plurality of social network members is received. A first member of the plurality of social network members is allowed to identify a second member of the plurality of social network members with whom the first member wishes to establish a relationship. The data is then sent to the second member about the first member based on the identification. Input from the second member is received in response to the data. The relationship between the first member and the second member is confirmed based on the input in order to map the first member to the second member.

19 Claims, 5 Drawing Sheets

Related U.S. Application Data

(60) Provisional application No. 60/750,844, filed on Dec. 14, 2005.

(51) Int. Cl.
  *G06Q 50/10* (2012.01)
  *H04L 29/06* (2006.01)
  *G06F 16/958* (2019.01)
  *H04L 29/08* (2006.01)

(56) References Cited

U.S. PATENT DOCUMENTS

| | | | |
|---|---|---|---|
| 6,073,138 A | 6/2000 | Bezos | |
| 6,175,831 B1 | 1/2001 | Weinreich et al. | |
| 6,269,369 B1 | 7/2001 | Robertson | |
| 6,480,885 B1 | 11/2002 | Olivier | |
| 6,750,881 B1 | 6/2004 | Appelman | |
| 6,889,213 B1 | 5/2005 | Douvikas et al. | |
| 6,963,900 B2 | 11/2005 | Boyd | |
| 7,013,292 B1 | 3/2006 | Hsu | |
| 7,047,202 B2 | 5/2006 | Jaipuria et al. | |
| 7,069,308 B2* | 6/2006 | Abrams | G06Q 10/10 705/319 |
| 7,099,862 B2 | 8/2006 | Abrams | |
| 7,249,123 B2* | 7/2007 | Elder | G06Q 10/10 |
| 7,269,590 B2 | 9/2007 | Hull | |
| 7,409,362 B2* | 8/2008 | Calabria | G06Q 10/10 705/26.1 |
| 7,519,200 B2 | 4/2009 | Gokturk et al. | |
| 7,539,697 B1 | 5/2009 | Akella et al. | |
| 7,606,168 B2 | 10/2009 | Hess | |
| 7,613,769 B1 | 11/2009 | Robinson et al. | |
| 7,657,458 B2* | 2/2010 | Calabria | G06Q 30/0603 705/26.61 |
| 7,669,123 B2 | 2/2010 | Zuckerberg et al. | |
| 7,680,770 B1* | 3/2010 | Buyukkokten | G06Q 10/10 340/573.1 |
| 7,707,122 B2* | 4/2010 | Hull | H04L 51/12 705/319 |
| 7,725,492 B2 | 5/2010 | Sittig et al. | |
| 7,797,256 B2 | 9/2010 | Zuckerberg et al. | |
| 7,797,345 B1 | 9/2010 | Martino et al. | |
| 7,809,805 B2 | 11/2010 | Cheever et al. | |
| 7,827,208 B2 | 11/2010 | Bosworth et al. | |
| 7,827,265 B2* | 11/2010 | Cheever | G06Q 30/02 709/223 |
| 7,856,449 B1 | 12/2010 | Martino et al. | |
| 7,860,889 B1 | 12/2010 | Martino et al. | |
| 7,904,511 B2* | 3/2011 | Ryan | G06Q 50/01 709/204 |
| 7,945,653 B2 | 4/2011 | Morgenstern | |
| 7,933,810 B2 | 5/2011 | Zuckerberg et al. | |
| 7,970,657 B2 | 6/2011 | Morgenstern | |
| 8,027,943 B2 | 9/2011 | Juan et al. | |
| 8,136,145 B2 | 3/2012 | Fetterman et al. | |
| 8,171,128 B2 | 5/2012 | Zuckerberg et al. | |
| 8,204,952 B2 | 6/2012 | Stremel et al. | |
| 8,225,376 B2 | 7/2012 | Zuckerberg et al. | |
| 8,249,943 B2 | 8/2012 | Zuckerberg et al. | |
| 8,296,373 B2 | 10/2012 | Bosworth et al. | |
| 8,402,094 B2 | 3/2013 | Bosworth et al. | |
| 8,412,780 B2* | 4/2013 | Fox | G06Q 10/00 709/206 |
| 8,538,895 B2* | 9/2013 | Appelman | G06Q 10/10 705/319 |
| 8,549,651 B2 | 10/2013 | Callahan et al. | |
| 8,627,506 B2 | 1/2014 | Vera et al. | |
| 8,732,846 B2 | 5/2014 | D'Angelo et al. | |
| 8,832,132 B1 | 9/2014 | Spertus et al. | |
| 8,832,556 B2 | 9/2014 | Steinberg | |
| 8,887,066 B1 | 11/2014 | Deng et al. | |
| 8,898,239 B2* | 11/2014 | Appelman | G06Q 10/10 709/203 |
| 9,128,800 B2 | 9/2015 | D'Angelo et al. | |
| 9,432,383 B2* | 8/2016 | Johns | G06F 17/2247 |
| 9,582,482 B1* | 2/2017 | Sharifi | G06F 16/156 |
| 2001/0037721 A1 | 11/2001 | Hasegawa | |
| 2002/0059201 A1* | 5/2002 | Work | G06Q 10/10 |
| 2003/0145093 A1 | 7/2003 | Oren | |
| 2003/0222918 A1 | 12/2003 | Coulthard | |
| 2003/0225632 A1 | 12/2003 | Tong | |
| 2004/0024846 A1 | 2/2004 | Randall | |
| 2004/0088177 A1 | 5/2004 | Travis | |
| 2004/0148275 A1 | 7/2004 | Achlioptas | |
| 2004/0204973 A1 | 10/2004 | Witting et al. | |
| 2005/0021750 A1 | 1/2005 | Abrams | |
| 2005/0114759 A1 | 5/2005 | Williams | |
| 2005/0120084 A1 | 6/2005 | Hu et al. | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1* | 9/2005 | Pezaris | G06Q 10/0637 705/319 |
| 2005/0198020 A1 | 9/2005 | Jou | |
| 2005/0198031 A1* | 9/2005 | Pezaris | H04L 51/32 |
| 2005/0198305 A1 | 9/2005 | Garland | |
| 2005/0203807 A1 | 9/2005 | Pezaris | |
| 2005/0209999 A1 | 9/2005 | Pezaris et al. | |
| 2005/0216300 A1 | 9/2005 | Paseman | |
| 2005/0216550 A1 | 9/2005 | Pezaris | |
| 2005/0235062 A1 | 10/2005 | Lam | |
| 2005/0256756 A1 | 11/2005 | Lunt | |
| 2006/0004892 A1 | 1/2006 | Lunt et al. | |
| 2006/0041543 A1 | 2/2006 | Savant | |
| 2006/0042483 A1 | 3/2006 | Etkin | |
| 2006/0048059 A1* | 3/2006 | Etkin | G06K 9/00677 715/745 |
| 2006/0052091 A1 | 3/2006 | Achlioptas | |
| 2006/0064431 A1 | 3/2006 | Work | |
| 2006/0080613 A1 | 4/2006 | Onyon | |
| 2006/0085419 A1 | 4/2006 | Rosen | |
| 2006/0136419 A1 | 6/2006 | Brydon | |
| 2006/0143066 A1 | 6/2006 | Rosen | |
| 2006/0143183 A1 | 6/2006 | Goldberg | |
| 2006/0161599 A1 | 7/2006 | Garg et al. | |
| 2006/0173838 A1 | 8/2006 | Calabria | |
| 2006/0184617 A1 | 8/2006 | Nanda | |
| 2006/0190281 A1 | 8/2006 | Hee Voon | |
| 2006/0194186 A1 | 8/2006 | Nicholas | |
| 2006/0218225 A1 | 9/2006 | Kott | |
| 2006/0229063 A1 | 10/2006 | Rosenberg | |
| 2006/0230061 A1 | 10/2006 | Sadamura | |
| 2006/0247940 A1 | 11/2006 | Sample | |
| 2006/0248573 A1 | 11/2006 | Koch | |
| 2006/0256008 A1 | 11/2006 | Pannu | |
| 2006/0265227 A1 | 11/2006 | Zhu | |
| 2006/0293976 A1 | 12/2006 | Nam | |
| 2007/0038594 A1 | 2/2007 | Goodwin et al. | |
| 2007/0043688 A1* | 2/2007 | Kountz | G06F 17/241 |
| 2007/0174389 A1 | 7/2007 | Armstrong | |
| 2007/0208916 A1 | 9/2007 | Tomita | |
| 2007/0255721 A1* | 11/2007 | Chess | G06Q 10/06 |
| 2007/0282987 A1 | 12/2007 | Fischer | |
| 2008/0005076 A1 | 1/2008 | Wei | |
| 2008/0010343 A1 | 1/2008 | Payne | |
| 2008/0033776 A1 | 2/2008 | Escaffi | |
| 2008/0040428 A1 | 2/2008 | Marchese | |
| 2008/0070697 A1* | 3/2008 | Robinson | A63F 13/12 463/42 |
| 2008/0086458 A1 | 4/2008 | Robinson | |
| 2008/0189292 A1 | 8/2008 | Stremel et al. | |
| 2009/0048922 A1 | 2/2009 | Morgenstern et al. | |
| 2009/0049070 A1 | 2/2009 | Steinberg | |
| 2009/0049127 A1 | 2/2009 | Juan et al. | |
| 2009/0055435 A1 | 2/2009 | Kiviluoto et al. | |
| 2013/0297589 A1 | 11/2013 | Work et al. | |
| 2015/0066895 A1* | 3/2015 | Komissarchik | G06F 16/5846 707/709 |

(56) References Cited

U.S. PATENT DOCUMENTS

2015/0081277 A1* 3/2015 Behi .................. G06F 17/2705
704/9

OTHER PUBLICATIONS

Examination Report for New Zealand Patent Application No. 569509, dated Dec. 1, 2009, 1 page.
Flores, Fernando et al. "Computer systems and the design of organizational interaction." In ACM Transactions on Information Systems (TOIS), vol. 6, Issue 2, Apr. 1988.
Parzek, E. Social Networking to Chipin to a Good Cause [online]. Business Design Studio, Jun. 29, 2006 http://www.businessdesignstudio.com/resources/blogger/2006/06social-netwo-rking-tochipin-to-good.html.
U.S. Appl. No. 11/982,974, Ruchi Sanghvi, Systems and Methods for a Web-Based Social Networking Environment Integrated Within One or More Computing and/or Networking Applications, filed Nov. 5, 2007.
U.S. Appl. No. 60/965,624, Adam D'Angelo, Systems and Methods for Targeting Advertisements in a Social Network Environment, filed Aug. 20, 2007.
U.S. Appl. No. 60/965,852, Adam D'Angelo, Systems and Methods for Advertising, filed Aug. 22, 2007.
U.S. Appl. No. 60/966,442, Ezra Callahan, System and Method for Incorporating an Entity or Group other than a Natural Person into a Social Network, filed Aug. 28, 2007.
U.S. Appl. No. 60/967,842, Ezra Callahan, Systems and Methods for Dynamically Updating Privacy Settings, filed Sep. 7, 2007.
U.S. Appl. No. 61/005,614, Yishan Wong, Systems and Methods for Community Translations on a Web-Based Social Network, filed Dec. 5, 2007.
PCT International Search Report and Written Opinion, PCT Application No. PCT/US2006/047908, dated Mar. 11, 2008, six pages.

* cited by examiner

MAPPING RELATIONSHIPS BETWEEN MEMBERS IN A SOCIAL NETWORK

CROSS-REFERENCE TO RELATED APPLICATIONS

The present application is a continuation of U.S. patent application Ser. No. 11/639,655, filed on Dec. 14, 2006, which claims the benefit and priority of U.S. provisional patent application Ser. No. 60/750,844 filed on Dec. 14, 2005 and entitled "Systems and Methods for Social Mapping," each of which is herein incorporated by reference.

BACKGROUND OF THE INVENTION

Field of the Invention

The present invention relates generally to social networking, and more particularly to systems and methods for social mapping.

Description of Related Art

Conventionally, people have networked with one another by joining social clubs, attending social events, meeting friends through other friends, and so forth. The Internet has made keeping in touch with friends and acquaintances more convenient for many people. For other people, the Internet provides a social forum for networking and meeting new people.

For many people, the Internet more recently represents the principal way in which people meet new friends and remain in touch with existing friends. Thus, the Internet provides a medium for a complex array of interactions between vast numbers of individuals.

In order to facilitate communications between the vast numbers of individuals, various social networking websites have developed in recent years. Social networking websites can provide organizational tools and forums for allowing these individuals to interact with one another via the websites. However, many users are leery about providing information via the Internet. Many users prefer to limit communications to specific groups of other users, for example.

SUMMARY OF THE INVENTION

The present invention provides a system, method, and computer program for social mapping. Data about one or more social network members is received. A first social network member is allowed to identify at least one second social network member to establish a relationship. Data about the first social network member is then sent to the second social network member based on the identification. Input from the second social network member is received in response to the data. The relationship is confirmed based on the input in order to map the first social network member to the second social network member.

DETAILED DESCRIPTION

Figure 1:
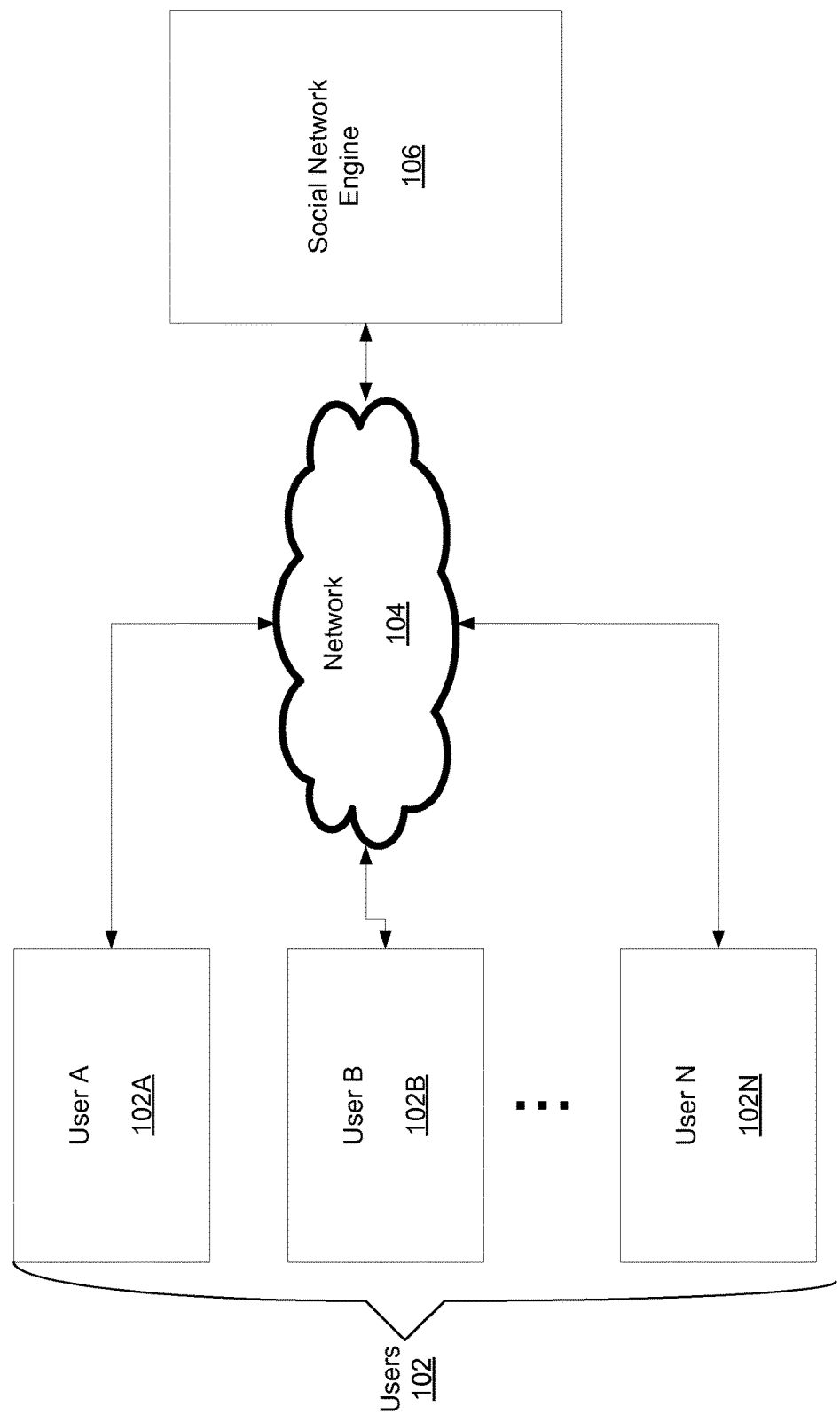
FIG. 1 illustrates a schematic diagram of an exemplary environment for social mapping.

FIG. 1 illustrates a schematic diagram of an exemplary environment for social mapping. One or more users 102, such as a user A 102A, a user B 102B, and a user N 102N, are in communication via a network 104 with a social network engine 106. The social network engine 106 may comprise a social networking website, one or more servers operating the social networking website, or any other device or application capable of providing social networking services via the network 104. The users 102 can access the services provided by the social network engine 106 via the network 104. Optionally, one or more of the users 102 may be able to access the social network engine 106 directly.

The users 102 can access the social network engine 106 via a computing device, such as a laptop or desktop computer, a cellular telephone, a personal digital assistant (PDA), a set top box, and so forth. The users 102 can view data about social network members via the social network engine 106, enter data about themselves and possibly others, join social network groups, and so forth. The users 102 are typically members of a social networking website associated with the social network engine 106, for example, and thus comprise the social network members.

According to exemplary embodiments, a user 102, such as the user A 102A, identifies one or more other members associated with the social network engine 106, such as the user B 102B and the user N 102N, with which the user A 102A wants to build a relationship or establish or alter the details of an existing relationship. Via the social network engine 106, the user A 102A enters the details about the relationship. The social network engine 106 then sends the data, such as the data comprising the details from the user A 102A to the other users (i.e., user B 102B and user N 102N). The user B 102B and the user N 102N then provide input in response to the data. The response may, for example, modify the data.

The relationship with the user B 102B and the user N 102N is confirmed, based on the input, by the social network engine 106. The confirmation may include denying the existence of the relationship, according to some embodiments. Any type of confirmation and/or input may be utilized to alter and/or establish the relationship between the user A 102A and the user B 102B and the user N 102N.

The relationship may comprise any type of relationship that exists between two of the users 102. For example, the user A 102A and the user B 102B may have worked together, been classmates, be related, have dated, and so forth. More than one relationship may exist between the two users. For example, the user A 102A and the user B 102B may have both worked together and dated. Processing, accessing, utilizing, modifying, and so forth the relationship data between two or more users is discussed further in association with FIGS. 2 through 5.

Figure 2:
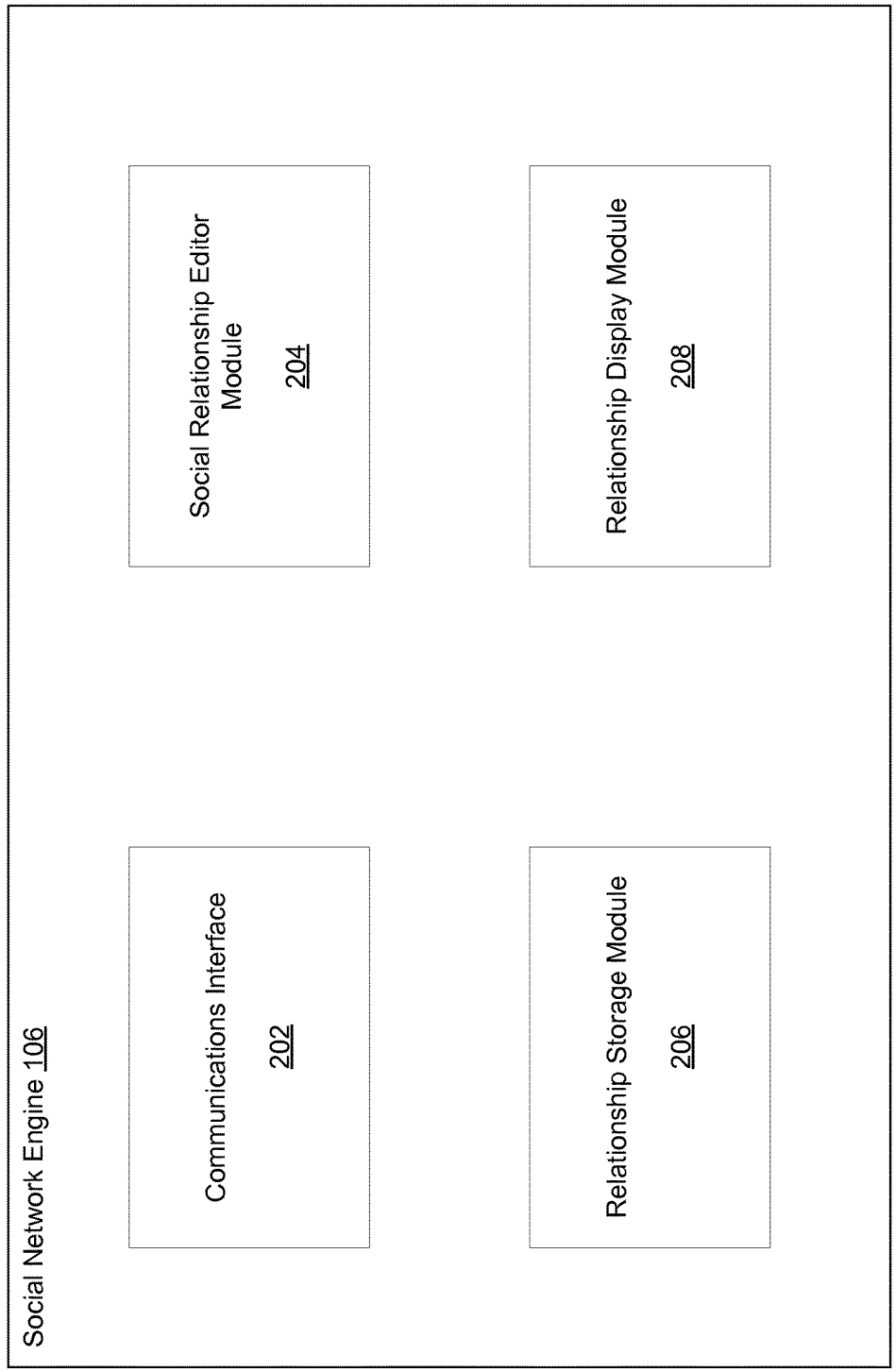
FIG. 2 illustrates a block diagram of an exemplary social network engine.

Referring now to FIG. 2, a block diagram of an exemplary social network engine, such as the social network engine 106 discussed in FIG. 1, is illustrated. A communications interface 202 is provided in association with the social network engine 106 for receiving data from and sending data to the users 102. The users 102 can send any type of data to the social network engine 106 via the network 104 and vice versa.

Typically, the users 102 access a website associated with the social network engine 106. For example, the social network engine 106 may host a social networking website where the users 102 can visit to interact with one another. The website can display various types of data about the users 102 to one another, such as profile information, or relationships a particular user, such as the user A 102A, has with other users, such as the user B 102B and the user N 102N. The users 102 may belong to particular communities within the social networking website, such as communities categorized according to school attended, workplace, geographical location, and so forth.

A social relationship editor module 204 is provided for editing the social relationships that the users 102 have with one another. For example, the user A 102A can specify a particular relationship with the user B 102B and the user N 102N. The user B 102B and/or the user N 102N may then be asked to confirm the particular relationship specified by the user A 102A. Accordingly, each relationship established via the social networking website is verified by two or more of the users 102 in the relationship. A social relationship editor display page associated with the social relationship editor module 204 is discussed further in association with FIG. 3.

The social relationship editor module 204 can track the one or more relationships between the users 102. The social relationship editor module 204 can also generate and send communications to the users 102 to confirm the relationships identified. As discussed herein, the users 102 are typically members of the social networking website. Accordingly, the users 102 interact with one another via the social network website associated with the social network engine 106 and can identify relationships with one another in order to facilitate the interactions, or for any other reason.

A relationship storage module 206 is provided for facilitating storage of the relationships between the users 102. The relationship storage module 206 can utilize any type of storage device or medium to store the various relationships. For example, the relationship storage module 206 can store the relationships in databases, on CD ROMS, in DRAM, and so forth. Any type of storage device or storage medium for storing the relationships, profile data associated with the users 102, or any other information associated with the users 102, is within the scope of various embodiments.

A relationship display module 208 is also provided in association with the social network engine 106. The relationship display module 208 identifies the relationships between the users 102 and generates a display page that indicates profile information, relationships, and other data about the users 102. For example, the user A 102A may be able to request, via a button, portal, link, and so forth, a display page regarding people from a particular community associated with the user A 102A, such as a college community. The relationship display module 208 can then generate and display data about the users 102 belonging to the particular community associated with the user A 102A to the user A 102A. The user A 102A can then utilize the display page to access more detailed data about each of the users 102 listed on the display page. The relationship display module 208 may display any data about the users 102 associated with the social networking site.

Although FIG. 2 shows various modules associated with the social network engine 106 (e.g., the communications interface 202, the social relationship editor module 204, the relationship storage module 206, and the relationship display module 208), fewer or more modules may be associated with the social network engine 106 and still fall within the scope of various embodiments. For example, a database (not shown) may be coupled to the social network engine 106 for storing data about the users 102.

Figure 3:
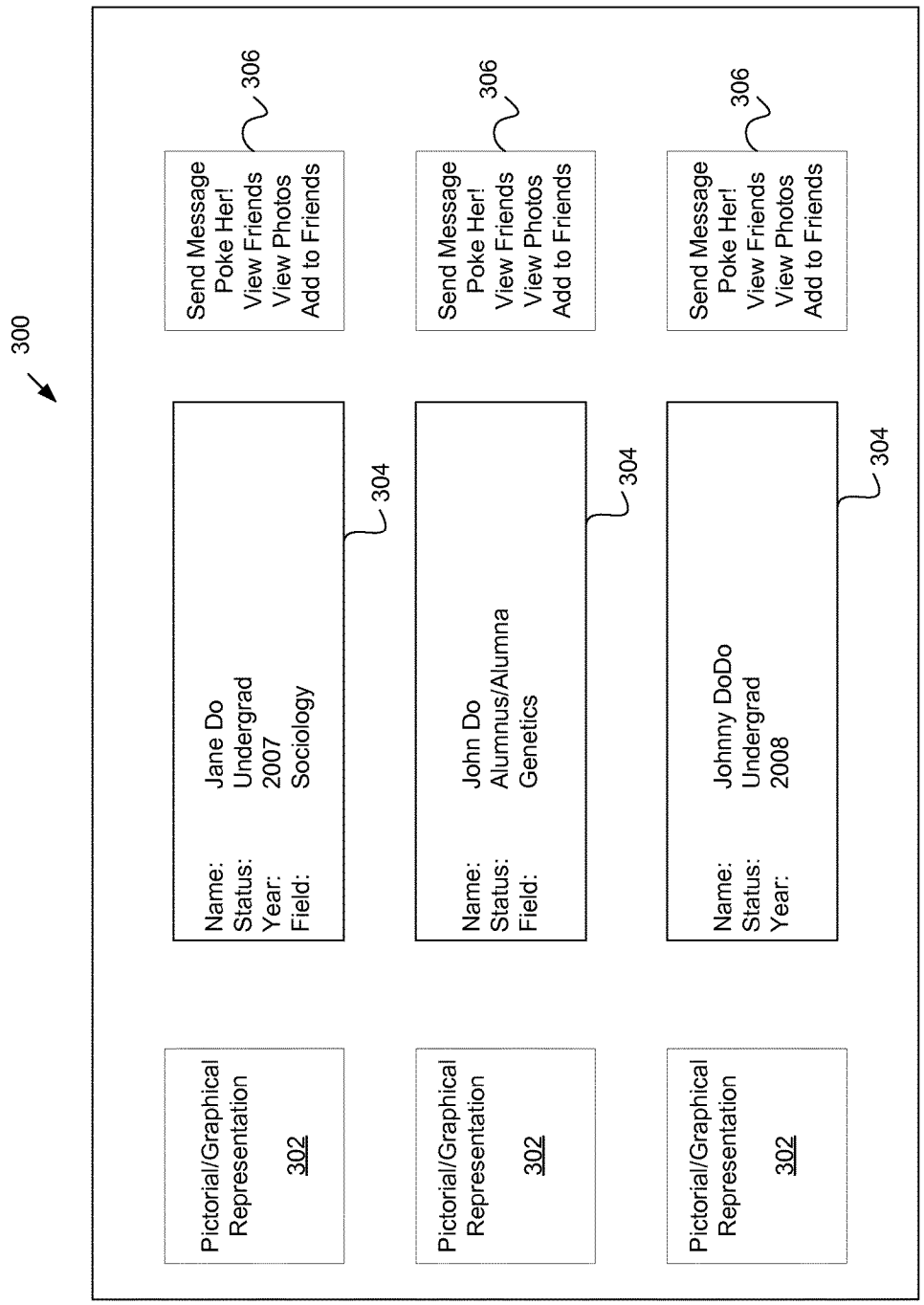
FIG. 3 illustrates an exemplary display page associated with the social network engine.

FIG. 3 illustrates an exemplary social network display page 300 that may be associated with the social network engine 106. The social network display page 300 includes a pictorial/graphical representation 302 for each of the users 102. For example, the user A 102A may utilize a photo of the user A 102, while the user B 102B may utilize a cartoon character to represent the user B 102B. Any type of picture, photo, graphic, icon, symbol, and so forth may be utilized to represent the users 102 via the pictorial/graphical representation 302.

Biographical data 304 is displayed about each of the users 102 that are listed. For example, the name, status, year of graduation, field of study, and so forth may be displayed as the biographical data 304 for each of the users 102. Any type of data may comprise the biographical data 304.

A user action area 306 may be associated with the social network display page 300. For example, the user action area 306 may be displayed in association with each of the users 102. In FIG. 3, the user action area 306 is displayed to the right of the biographical data 304 for each of the users 102. However, the user action area 306 may be displayed anywhere. For example, the pictorial/graphical representation 302 may be accessed, check-marked, highlighted, and so forth in order to display the user action area 306.

The user action area 306 allows the users 102 to select one or more actions to perform in association with a particular user, such as the user A 102A, about which the biographical data 304 is being viewed. For example, the users 102 can choose to send the users 102 an email or other message via the "send message" function, or to utilize a "poke her!" function to be directed to a pop-up or similar screen, confirming that the user 102 wishes to "poke" a displayed user. An announcement may be sent to the displayed user informing the displayed user that the displayed user has been "poked" by another user 102.

The user action area 306 may also allow the users 102 to utilize a "view friends" function" in order to view the data about friends of the users 102, to utilize a "view photos" function to view photos associated with the user, and/or an "add to friends" function to request addition to a friends group of the user 102. Various other options may be accessed via the user action area 306. For example, the users 102 may be able to access stories about a particular user, such as the user B 102B, via the user action area 306.

The social network display page 300 may be utilized for displaying any type of data about the users 102. The social network display page 300 shown in FIG. 3 is an exemplary display page for displaying various users belonging to a community. Display pages may also be utilized to display profile data about individual users or groups of users, to display data about the users 102 belonging to various communities, to display stories about the users 102, and so forth. The social network display page 300 in FIG. 3 may be utilized, according to exemplary embodiments, to identify and/or select the users 102 known to a particular user, such as the user A 102A with whom the user A 102A wants to establish a relationship. The social network display page 300 may be generated by the relationship display module 208 and be displayed in response to a search or filter function initiated by the user A 102A, such as a search performed. As discussed herein, the data about the users 102 for the social network display page 300 may be stored in a database, cache memory, or any other memory utilized by the relationship storage module 206 or another storage module (not shown) for storing data about the users 102.

According to some embodiments, the social network display page 300 may be utilized to display a directory of the users 102, a collection of the users 102, a directory of established relationships associated with the user A 102A, for example, and so forth. As discussed herein, any of the data associated with the users 102 may be displayed utilizing the social network display page 300 or any other display mechanism associated with the social network engine 106.

Figure 4:
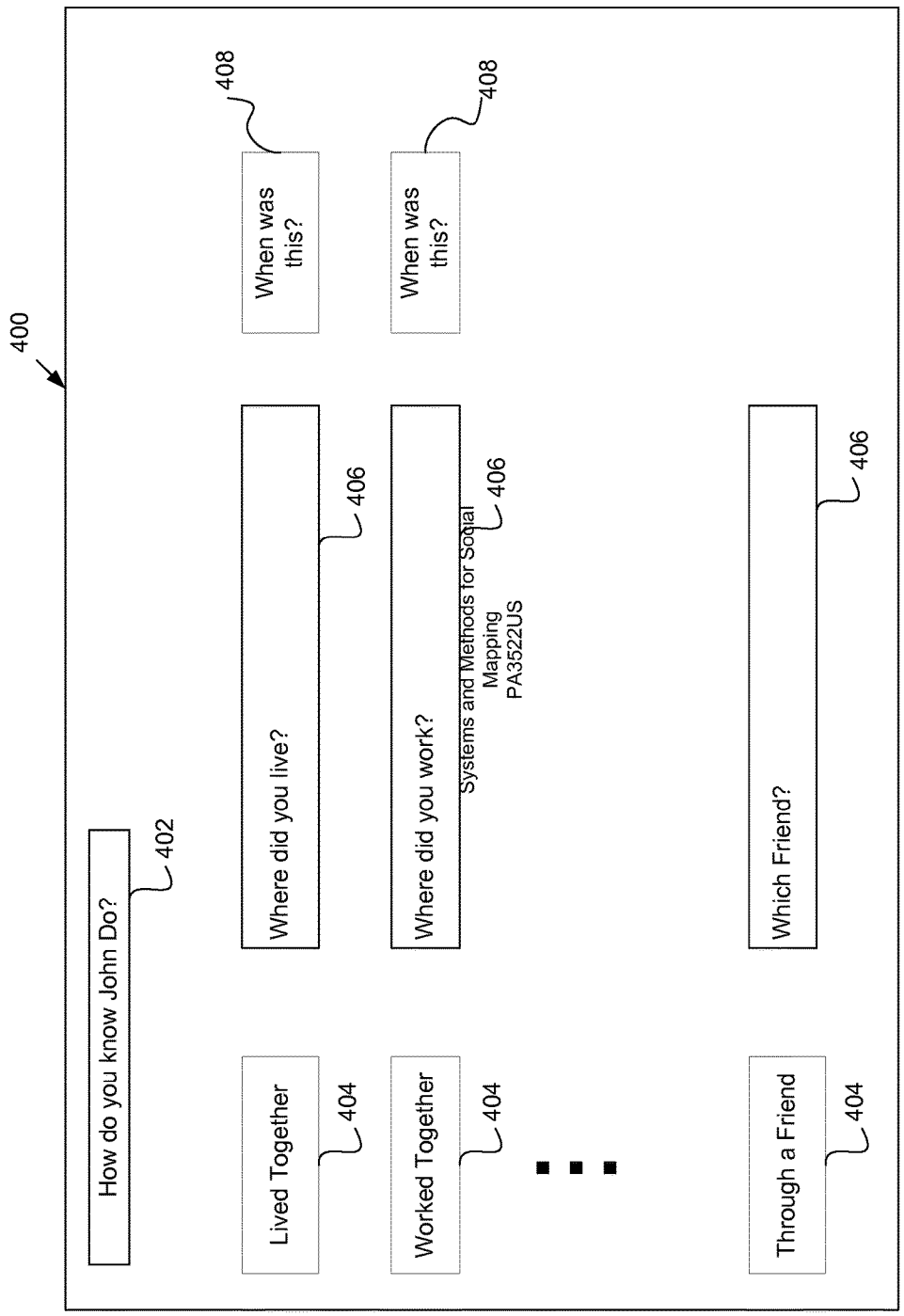
FIG. 4 illustrates an exemplary social editor page associated with the social network engine.

FIG. 4 illustrates an exemplary social editor page associated with the social network engine 106. The social editor page 400 illustrated in FIG. 4 can be utilized to question the users 102 about the relationships with other users 102 associated with the social networking website. The social editor page 400 may be sent in response to a request from a particular user, such as the user A 102A, to form or otherwise establish a relationship with another user, such as the user B 102B, for example.

A social editor inquiry 402 may be utilized to establish the subject matter for the social editor page 400. For example, FIG. 4 illustrates the social editor page 400 for the social editor inquiry 402 "How do you know John Do?" However, the social editor inquiry 402 may comprise any inquiry, such as "Is the information provided by John Do about your relationship accurate?" Any type of social editor inquiry 402 may be provided in association with the social editor page 400.

A relationship type identifier 404 may be displayed for allowing a user 102 to select and/or identify the relationship the user 102 has with other users 102. For example, the user A 102A may select that the user A 102A lived with the user B 102B, worked with the user B 102B, and/or knows the user B 102B through a friend. One or more of the relationship identifiers 404 may be selected. As discussed herein, the users 102 may know each other via more than one means.

A relationship details identifier 406 allows the users 102 to further specify the nature of the relationship. For example, the relationship details identifier 406 may establish where the users 102 lived together, where the users 102 worked together, which friends the users 102 have in common, and so forth. Although only one relationship details identifier 406 is illustrated, more than one relationship details identifier 406 associated with each of the relationships may be provided.

A timeframe identifier 408 may also be provided in association with the social editor page 400. The timeframe identifier 408 may be utilized to establish a time or timeframe associated with the relationship identifier 402. For example, the timeframe identifier 408 can specify when the users 102 lived together, worked together, dated, and so forth.

The relationship identifier 402, the relationship type identifier 406, the relationship details identifier 406, and/or the timeframe identifier 408 may be selectable via a drop down menu, a text entry box, a check box, and/or via any other selection method or combination of selection methods. According to exemplary embodiments, the social editor inquiry 402 is pre-populated with selections when sent to the users 102 with whom confirmation of the relationship is sought. Further, the social editor page 400 can be automatically populated, partially or wholly, utilizing data already stored about the users 102 and/or the relationship the users 102 have established with one another on previous occasions.

The arrangement, presentation, display, and/or subject matter described in connection with FIGS. 3 and 4 may vary and still remain within the scope of various embodiments. For example, additional relationship questions may be utilized in association with the social relationship page 400 or additional types of the biographical data 304 may be displayed via the social network display page 300.

For example, the user A 102A can complete the social editor page 400 by selecting from the relationship identifier 402, the relationship type identifier 404, the relationship details identifier 406, the timeframe identifier 408, and/or any other identifiers that may be provided via the social editor page 400, in order to provide details about the relationship the user A 102A has with the user B 102B, for example. The user B 102B can then be sent the pre-populated social editor page 400 and asked to confirm the data provided by the user A 102A. The user B 102B can confirm the accuracy of the data on the social editor page 400, modify the data on the social editor page 400, add to the data on the social editor page 400, and/or deny the accuracy of the data on the social editor page 400.

The details about the relationship established via the social editor page 400 can be stored by the relationship storage module 206. For example, a relationship database (not shown) may be utilized to map the relationships between the users 102 associated with the social network engine 106. The map can show a network of the relationships between the users 102, in one instance.

The subject matter of the inquiries and the data associated with the social editor page 400 may include any topics, such as membership in a club, a team, a church, etc.; common courses, classes, institutions, programs of study, etc.; common travels, journeys, adventures, parties, conferences, etc.; common familial relationships, friends, acquaintances, romantic partners or interests, musical interests, restaurants, bars, pubs, etc.; whether two or more of the users 102 met randomly, accidentally, purposefully, via online activities, etc.; and/or whether two or more of the users 102 have never met, etc. Any type of data can be established via the social editor page 400, as discussed herein.

As discussed herein, a confirmation request can be sent to the users 102 in response to completion of the social editor page 400. The social relationship editor module 204 can send a communication, for example, to the user B 102B that the user A 102A selected the user B 102B as a person the user A 102A may know or with whom the user A 102A wishes to establish a relationship. The user B 102B can elect to confirm the data provided by the user A 102A, adjust or edit the data, send a message to the user A 102A regarding the relationship, deny the existence of the relationship, add data about the relationship, and so forth. If the user B 102B edits or adds to the data, the user A 102A may be asked to confirm the added or edited data, according to exemplary embodiments.

The users 102 can view the status of the relationships with other of the users 102 via a display page that indicates the status. For example, the social network display page 300 can include the status of the relationships with each of the users 102 displayed on the social network display page 300. The biographical data 304, for example, can also display whether the relationship with the user about which the biographical data 304 is displayed has accepted, denied, or is reviewing the data about the relationship or proposed relationship. The status may comprise a written description of the relationship, the time of the relationship, and/or any other details about the relationship.

Details of a social map generated based on the relationship the users 102 have with one another may also be displayed via the social network display page 300. For example, a social map that shows details about a relationship between the user B 102B and the user A 102A may be generated, displayed, and or accessed by the users 102.

The social network display page 300 can also display the users 102 in an ascending or descending order according to a chronology associated with the relationships the users 102 have with other users. For example, the user N 102N may be displayed before the user B 102B in a listing requested by the user A 102A because the user A 102A has known the user N 102N for a longer period of time than the user B 102B. The users 102 can be displayed according to common groups, association with common events, situations, or occurrences, and so forth.

Figure 5:
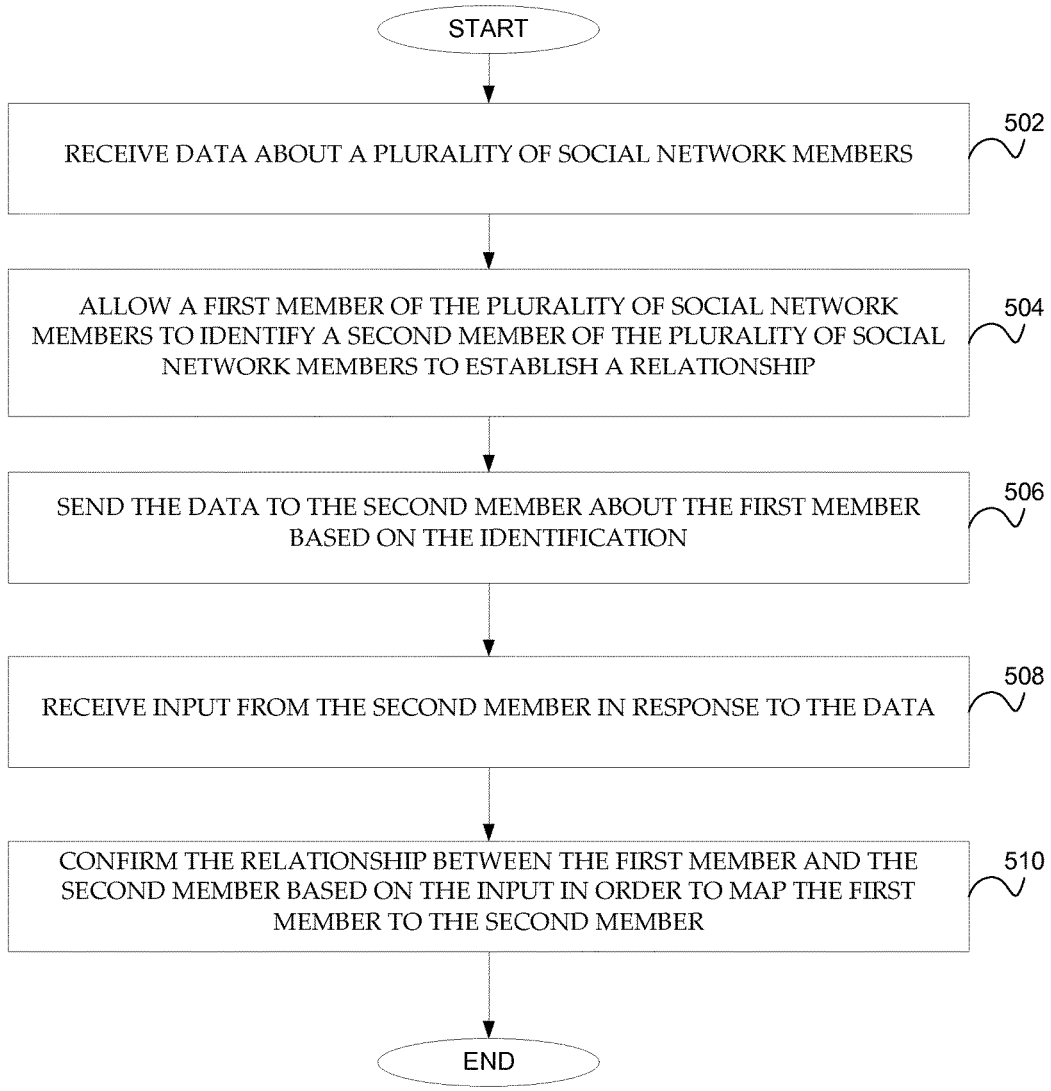
FIG. 5 illustrates a flow diagram of an exemplary process for social mapping.

Referring now to FIG. 5, a flow diagram of an exemplary process for social mapping is illustrated. At step 502, data about one or more social network members is received. The social network members may comprise the users 102 described herein, such as the user A 102A, the user B 102B, and/or the user N 102N. Any number of users may comprise the social network members. As discussed herein, the users 102 can utilize the social networking website associated with the social network engine 106 to access and/or provide data about other of the users 102.

At step 504, a first social network member is allowed to identify at least one second social network member to establish a relationship. For example, the user A 102A can select the user B 102B with whom the user A 102A wants to establish a relationship. The user A 102A can select the user B 102B from a list, such as the list displayed via the social network display page 300 discussed herein.

At step 506, the data is sent to the second social network member about the first social network member based on the identification. For example, once the user A 102A selects the user B 102B for establishing a relationship, the user A 102A may be directed to a social editor page 400 generated by the social relationship module 204. The social relationship editor module 204 can, optionally, pre-populate the social editor page 400 with data already stored by the relationship storage module 206 about the user A 102A and the relationship user A 102A may already have established or partially established with the user B 102B, for example.

At step 508, input is received from the second social network member in response to the data. For example, the user B 102B may confirm the data provided by the user A 102A utilizing the social editor page 400. The user B 102B may also deny that the data is accurate or deny the relationship generally, edit the data, add to the data, and so forth. Any action taken by the user B 102B in response to receiving the data regarding the relationship or proposed relationship from the user A 102A is within the scope of various embodiments.

At step 510, the relationship is confirmed based on the input in order to map the first social network member to the at least one second social network member. According to some embodiments, the social network engine 106 can determine whether or not to confirm the relationship before the relationship is confirmed. The social relationship editor module 204 can confirm the relationship, for example, based on the input from the user B 102B. The confirmation may comprise establishing that the relationship data is accurate, editing the relationship data, denying the relationship data, adding to the relationship data, and/or optionally requesting further confirmation from the user A 102A.

According to some embodiments, the relationship data is mapped to the user B 102B once the user B 102B confirms the relationship data as accurate. In other words, if the user B 102B confirms that the user B 102B, indeed, has a relationship of some type with the user A 102A, the relationship details can be added to a profile associated with the user B 102B, for example.

The user A 102A and/or the user B 102B may also be asked if privacy settings should be modified in response to the newly established relationship. For example, the user B 102B may confirm the relationship with the user A 102A, but may only want the user A 102A to have access to the data about the user B 102B that the user B 102B allows the users 102 within a specific community or group to access. The privacy settings can be modified at any time. For example, a privacy settings module (not shown) may be associated with the social network engine 106 for specifying the privacy settings for each of the users 102 with respect to which data about the users 102 each other of the users 102 can access.

According to other embodiments, the relationship data may be presented or displayed according to the relevance of the relationship data to online or offline interactions between the users 102, to timeframes based on online or offline interactions, and so forth. For example, the social network engine 106 can suggest other of the users 102 with whom the user A 102A may want to form a relationship based on the fact that those other users 102 attended the same school, at the same time.

Predictive tools for forecasting which of the users 102 will establish relationships, analytical tools for determining the nature and influence the users 102 have on one another, and any other tools may be developed based on the relationship data. For example, the social network engine 106 can identify stories about the user B 102B that the user A 102A will find most interesting based on the relationship data.

Further, the users 102 can be grouped according to the established relationships. The groupings can be utilized to display various types of information to the users 102, suggest other of the users 102 with which relationships should be established, and so forth.

While various embodiments have been described above, it should be understood that they have been presented by way of example only, and not limitation. For example, any of the elements associated with the social network engine 106 may employ any of the desired functionality set forth hereinabove. Thus, the breadth and scope of a preferred embodiment should not be limited by any of the above-described exemplary embodiments.

What is claimed is:

1. A method comprising:
   identifying an established relationship between a first member and a second member of a social network, the established relationship indicating the first member and second member are directly connected based on a mutually declared relationship between the first and second members on the social network;
   identifying a grouping of members defining a subset of members of the social network that includes the first member and the second member based on a common characteristic;
   selecting a third member for the first member to establish a mutually declared relationship with based on the identified grouping, the identified grouping also including the third member, the third member possessing the common characteristic, the third member not having an established relationship with the first member, and the third member not having an established relationship with the second member;
   providing, to the first member, a suggestion to establish a mutually declared relationship on the social network with the third member;

receiving an indication from the first member that the first member would like to establish a mutually declared relationship with the third member;

responsive to receiving the indication, providing, to the third member, the indication that the first member would like to establish a mutually declared relationship with the third member;

receiving input from the third member to confirm the mutually declared relationship with the first member; and responsive to receiving the input, storing the mutually declared relationship in a relationship database, the relationship database mapping relationships between users within the social network.

2. The method of claim 1, where one or more privacy settings are associated with the established relationship between the first member and the second member, the privacy settings being provided by one of the first member and the second member and governing who can access the details about the established relationship.

3. The method of claim 1, where the established relationship between the first member and the second member is also established between one or more other members of the social network.

4. The method of claim 1, wherein the established relationship between the first member and the second member includes details about the established relationship.

5. The method of claim 4, wherein the details about the established relationship describes a time or timeframe associated with the established relationship.

6. The method of claim 4, wherein the details about the established relationship between the first member and the second member are input by one of the first member and the second member and the details are verified by the other of the first member and the second member before the relationship between the first member and the second member is established.

7. The method of claim 4, wherein the details about the established relationship between the first member and the second member describe how the first member and the second member know each other.

8. The method of claim 7, wherein the details about the established relationship between the first member and the second member further comprise at least one of a group consisting of the first member and the second member having lived together, the first member and the second member having worked together, the first member and the second member having been classmates, the first member and the second member being related, and the first member and second member having dated.

9. The method of claim 4, wherein the details about the established relationship between the first member and the second member include a status of the established relationship.

10. The method of claim 9, wherein the status of the established relationship between the first member and the second member describes whether a member of the established relationship has approved the details in the established relationship, the status being one of: accepted the details, rejected the details, or reviewing the details.

11. The method of claim 1, wherein the grouping comprises members belonging to a particular community within the social networking website.

12. The method of claim 11, wherein the community is categorized according to at least one of school attended, workplace and geographical location.

13. The method of claim 1, further comprising providing a suggestion to the first member to establish a relationship with another member, in addition to the third member, in the grouping shared by both the first member and second member of the social network.

14. The method of claim 1, wherein the common characteristic is a self-declared social attribute on the members' profiles.

15. The method of claim 1, wherein the third member is selected from the grouping based on a projected measure of influence of the third member to the first member.

16. The method of claim 15, wherein the projected measure of influence of the third member to the first member is determined based on a relevance to the first member of social networking content posted by the third member accessible to the second member that is inaccessible to the first member based on access privileges for the social content.

17. The method of claim 15, wherein the projected measure of influence of the third member to the first member is determined based on a projected measure of influence of the third member to the second member, and a projected measure of influence of the second member to the first member.

18. The method of claim 1, further comprising receiving a modification to the details about the established relationship between the first member and the second member from one of the first member and the second member.

19. A non-transitory, computer-readable medium comprising instructions that, when executed by a processor, cause the processor to:

identify an established relationship between a first member and a second member of a social network, the established relationship indicating the first member and second member are directly connected based on a mutually declared relationship between the first and second members on the social network;

identify a grouping of members defining a subset of members of the social network that includes the first member and the second member based on a common characteristic;

select a third member for the first member to establish a mutually declared relationship with based on the identified grouping, the identified grouping also including the third member, the third member possessing the common characteristic, the third member not having an established relationship with the first member, and the third member not having an established relationship with the second member;

provide, to the first member, a suggestion to establish a mutually declared relationship on the social network with the third member;

receive an indication from the first member that the first member would like to establish a mutually declared relationship with the third member;

responsive to receiving the indication, provide, to the third member, the indication that the first member would like to establish a mutually declared relationship with the third member;

receive input from the third member to confirm the mutually declared relationship with the first member; and responsive to receiving the input, store the mutually declared relationship in a relationship database, the relationship database mapping relationships between users within the social network.

* * * * *